United States Patent
Naveh

(10) Patent No.: US 7,171,393 B2
(45) Date of Patent: Jan. 30, 2007

(54) SOLVING CONSTRAINT SATISFACTION PROBLEMS USING VARIABLE-RANGE HOPPING

(75) Inventor: Yehuda Naveh, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 10/624,664

(22) Filed: Jul. 22, 2003

(65) Prior Publication Data

US 2005/0021486 A1 Jan. 27, 2005

(51) Int. Cl.
*G06E 1/00* (2006.01)
*G06E 3/00* (2006.01)
*G06F 15/18* (2006.01)
*G06G 7/00* (2006.01)

(52) U.S. Cl. ...................................... 706/19
(58) Field of Classification Search ............... 706/19
See application file for complete search history.

(56) References Cited

U.S. PATENT DOCUMENTS 5,428,712 A * 6/1995 Elad et al. ............... 706/46
5,636,328 A * 6/1997 Kautz et al. ............. 706/45
6,301,613 B1 * 10/2001 Ahlstrom et al. ......... 709/223
6,556,978 B1 * 4/2003 Ginsberg et al. ......... 706/19

OTHER PUBLICATIONS

Kalev Kask & Rina Dechter; Stochastic Local Search for Bayesian Networks, 1999.*
Freuder et al.; Systematic Versus Stochastic Constraint Satisfaction.*
Bin, E. et al., "Using a Constraint Satisfaction Formulation and Solution Techniques for Random test Program Generation," IBM Systems Journal, vol. 41, No. 3, 2002.
Selman, Bert, et al., "A New Method for Solving Hard Satisfiability Problems," Proceedings of the Tenth National Conference on Artificial Intelligence (AAAI-92), San Jose, CA, Jul. 1992, 440-446.

* cited by examiner

*Primary Examiner*—Anthony Knight
*Assistant Examiner*—Michael B. Holmes
(74) *Attorney, Agent, or Firm*—Stephen C. Kaufman

(57) ABSTRACT

A method for solving a constraint satisfaction problem (CSP) includes choosing a first state corresponding to a first set of values of a set of variables, and selecting a hop distance within a state space of the variables responsively to a random distance selection criterion. A second state corresponding to a second set of the values of the variables is selected, such that the second state is separated from the first state by the hop distance. Constraint costs of the first and second states are compared. If the cost of the second state is lower than the cost of the first state, the first state is redefined to correspond to the second set of the values of the variables. These steps are repeated until a solution of the CSP is found.

12 Claims, 2 Drawing Sheets

SOLVING CONSTRAINT SATISFACTION PROBLEMS USING VARIABLE-RANGE HOPPING

FIELD OF THE INVENTION

The present invention relates generally to solving constraint satisfaction problems, and specifically to methods and systems for solving such problems using stochastic techniques.

BACKGROUND OF THE INVENTION

Many of the tasks that are addressed by decision-making systems and artificial intelligence can be framed as constraint satisfaction problems (CSPs). In this framework, the task is specified in terms of a set of variables, each of which can assume values in a given domain, and a set of predicates, or constraints, that the variables are expected to satisfy. (The constraints may include "hard constraints," which must be satisfied by solutions to the CSP, and "soft constraints," which may not be satisfied by all solutions.) The set of variables and constraints is referred to as a constraint network. Each constraint may be expressed as a relation, defined over some subset of the variables, denoting valid combinations of their values. A solution to the problem is an assignment of a value to each variable from its domain that satisfies all of the hard constraints.

Constraint satisfaction methods have been found useful in a variety of applications, including:
Artificial intelligence
Robotic control
Temporal reasoning
Natural language parsing
Spatial reasoning
Test generation for software and hardware systems
Machine vision
Medical diagnosis
Resource allocation
Crew scheduling
Time tabling
Frequency allocation
Graph coloring.

For example, Bin et al. describe a constraint satisfaction method for use in automated testing of hardware circuits, in a paper entitled "Using a Constraint Satisfaction Formulation and Solution Techniques for Random Test Program Generation," *IBM Systems Journal* 41:3 (2002), pages 386–402, which is incorporated herein by reference. The authors use an analytical constraint satisfaction algorithm to generate addresses and memory access instructions that provide effective verification of the design of a computer processor. This algorithm, which is based on maintaining arc consistency in the constraint network, is described further by Emek et al. in U.S. patent application Ser. No. 09/788,152, published as U.S. Patent Application Publication 2002/0169587 A1, which is assigned to the assignee of the present patent application, and whose disclosure is incorporated herein by reference.

Stochastic techniques for CSP solving are also known in the art. For example, U.S. Pat. No. 5,636,328, whose disclosure is incorporated herein by reference, describes methods and apparatus for finding values that satisfy a set of constraints, applied particularly to control of a robotic arm. The technique described in this patent is used in local search procedures for finding such constraint-satisfying values, with the aim of overcoming the tendency of such local search procedures to "get stuck" at certain points in the search.

Another stochastic CSP solving technique, known as GSAT, is described by Selman et al., in "A New Method for Solving Hard Satisfiability Problems," *Proceedings of the Tenth National Conference on Artificial Intelligence* (AAAI-92, San Jose, Calif., 1992), pages 440–446, whose disclosure is incorporated herein by reference. GSAT performs a greedy local search for a satisfying assignment of a set of propositional clauses. It then changes the assignment of the variable that leads to the largest increase in the total number of satisfied clauses, repeating this procedure until a satisfying assignment is found (or until time runs out). GSAT mimics standard local search procedures used for finding approximate solutions to optimization problems, in that it explores only potential solutions that are "close" to the one currently being considered, although it may also include "sideways" moves.

SUMMARY OF THE INVENTION

As noted above, stochastic CSP solvers essentially map the CSP into an optimization problem, in which the optimization metrics are defined by the constraints, and solutions to the problem are found at global minima of the problem topography. Local search procedures that are used in stochastic CSP solvers attempt to find these global minima while escaping local minima in the topography where the search may get stuck.

Embodiments of the present invention provide improved methods and apparatus for stochastic solving of CSPs based on the novel principle of variable-range hopping. In these embodiments, a metric, referred to herein as a price, is associated with each of the constraints of the problem. States of the system that is modeled by the CSP are defined by the values of the variables in the problem. The CSP solver calculates the topographic cost of any given state as a sum of the prices of all the constraints, which depend, in turn, on the values of the variables to which each constraint applies. The problem is solved when the solver finds a state whose topographic cost is zero.

To find the solutions to the problem, the CSP solver begins from an initial state within the state space of the system, as defined by a set of values of the variables, and then hops to a new state by changing the value of a certain variable or variables. (A hop in this context refers to any change in the values of one or more of the variables that generates a new state of the system.) When the new state has a lower topographic cost than the current state, the new state becomes the current state. The solver then attempts to hop to another new state with still lower cost, continuing iteratively in this manner until a solution is found.

The hop distance at each iteration of this process is chosen by the CSP solver based on random selection criteria. Although the average hop size to each new state may tend to drop as the computed cost decreases, the random criteria permit the solver to make longer hops, of variable range within the state space, at any point in the procedure. The size of these variable-range hops is generally independent of the average step size. When one of the long-range hops leads to a new state of lower topographic cost than the current state, the solver replaces the current state with this new state, notwithstanding the large distance traversed in the state space. This variable-range hopping technique enables the CSP solver to escape effectively from local minima, without having to take any cost-increasing steps. As a result, the solver is able to find solutions to large problems with enhanced speed, by comparison with CSP solving methods known in the art, particularly in complex topographies in which local cost gradients do not consistently lead to global minima.

In some embodiments of the present invention, the CSP solver learns characteristics of the problem topography, and uses these learned characteristics in choosing the new states to evaluate at each iteration. Based on these learned characteristics, the solver may conclude, for example, that certain hop sizes or other hop characteristics are likely to lead to a new state of lower cost. The solver may then choose its next hop at random within bounds defined by the learned characteristics (while still taking some variable-range hops irrespective of the learned characteristics). Additionally or alternatively, the solver may intersperse the stochastic hops with deterministic state selections that are appropriate to the particular CSP in question.

There is therefore provided, in accordance with an embodiment of the present invention, a method for solving a constraint satisfaction problem (CSP) defined by a group of variables and constraints applicable to the variables, the method including the steps of:

(a) choosing a first state corresponding to a first set of values of the variables;

(b) selecting a hop distance within a state space of the variables responsively to a random distance selection criterion;

(c) choosing a second state corresponding to a second set of the values of the variables, such that the second state is separated from the first state by the hop distance;

(d) comparing a first cost, determined by applying the constraints to the first set of the values of the variables, to a second cost, determined by applying the constraints to the second set of the values of the variables;

(e) if the second cost is closer than the first cost to meeting a condition indicative that the constraints are satisfied, redefining the first state to correspond to the second set of the values of the variables; and (f) repeating steps (b) through (e) until the second cost meets the condition, whereby the second set of the values of the variables represents a solution of the CSP.

In one embodiment, choosing the first state includes determining that a subset of the values of the variables cannot satisfy at least one of the constraints, and choosing the first state at random from a range of the values of the variables, while eliminating the subset of the values from the range. In another embodiment, choosing the first state includes determining that a subset of the values of the variables are consistent with at least one of the constraints, choosing the first state at random out of a uniform distribution of the subset of the values.

In disclosed embodiments, comparing the first cost to the second cost includes computing respective prices of the constraints based on the values of the variables to which the constraints respectively apply, and summing the respective prices to determine the first and second costs. Typically, computing the respective prices includes associating a respective price function with each constraint, such that the price function is zero when the constraint is satisfied and non-zero when one or more of the values of the variables do not satisfy the constraint, and redefining the first state includes redefining the first state to correspond to the second set of the values of the variables when the second cost is less than the first cost.

Typically, each of the variables includes a respective sequence of bits, and selecting the hop distance includes selecting a number of the bits to flip in one or more of the variables so as to transform the first state into the second state.

In some embodiments, redefining the first state includes learning a characteristic of the hop distance from the first state to the second state, and selecting the hop distance includes applying the learned characteristic in selecting the hop distance. Typically, applying the learned characteristic includes selecting the hop distance at random out of a plurality of hop distance records.

Alternatively or additionally, selecting the hop distance includes providing a predetermined strategy for choosing the second state, and determining at random whether to use the predetermined strategy or the random distance selection criterion in choosing the second state. Typically, each of the variables includes a respective sequence of bits, and providing the predetermined strategy includes providing a list of the bits to be flipped so as to cover a selected portion of the state space.

In one embodiment, the variables are characteristic of inputs to a system under test, and the method includes applying the inputs to test the system responsively to the second set of the values of the variables. For example, the system may include an electronic processor, and applying the inputs may include determining at least one of a command and an address to be input to the processor responsively to the second set of the values of the variables.

In another embodiment, the variables are characteristic of control parameters of a mechanical system, and the method includes generating a command to control the system responsively to the second set of the values of the variables.

In still another embodiment, the variables are characteristic of features of an image containing visual information, and the method includes identifying an object in the image based on the features, responsively to the second set of the values of the variables.

In yet another embodiment, the variables are characteristic of a natural language input, and the method includes parsing the natural language, responsively to the second set of the values of the variables, so as to interpret the language.

In a further embodiment, the variables are characteristic of a condition, and the method includes determining a diagnosis of the condition responsively to the second set of the values of the variables.

In still a further embodiment, the variables are characteristic of resources whose use is to be scheduled, and the method includes scheduling the use of the resources responsively to the second set of the values of the variables.

There is also provided, in accordance with an embodiment of the present invention, apparatus for solving a constraint satisfaction problem (CSP) defined by a group of variables and constraints applicable to the variables, the apparatus including a CSP processor, which is arranged to solve the CSP by the steps of:

(a) choosing a first state corresponding to a first set of values of the variables;

(b) selecting a hop distance within a state space of the variables responsively to a random distance selection criterion;

(c) choosing a second state corresponding to a second set of the values of the variables, such that the second state is separated from the first state by the hop distance;

(d) comparing a first cost, determined by applying the constraints to the first set of the values of the variables, to a second cost, determined by applying the constraints to the second set of the values of the variables;

(e) if the second cost is closer than the first cost to meeting a condition indicative that the constraints are satisfied, redefining the first state to correspond to the second set of the values of the variables; and (f) repeating steps (b) through (e) until the second cost meets the condition, whereby the second set of the values of the variables represents a solution of the CSP.

There is additionally provided, in accordance with an embodiment of the present invention, a computer software product for solving a constraint satisfaction problem (CSP) defined by a group of variables and constraints applicable to the variables, the product including a computer-readable medium, in which program instructions are stored, which instructions, when read by a computer, cause the computer to solve the CSP by the steps of:

(a) choosing a first state corresponding to a first set of values of the variables;

(b) selecting a hop distance within a state space of the variables responsively to a random distance selection criterion;

(c) choosing a second state corresponding to a second set of the values of the variables, such that the second state is separated from the first state by the hop distance;

(d) comparing a first cost, determined by applying the constraints to the first set of the values of the variables, to a second cost, determined by applying the constraints to the second set of the values of the variables;

(e) if the second cost is closer than the first cost to meeting a condition indicative that the constraints are satisfied, redefining the first state to correspond to the second set of the values of the variables; and (f) repeating steps (b) through (e) until the second cost meets the condition, whereby the second set of the values of the variables represents a solution of the CSP.

The present invention will be more fully understood from the following detailed description of the embodiments thereof, taken together with the drawings in which:

DETAILED DESCRIPTION OF EMBODIMENTS

Figure 1:
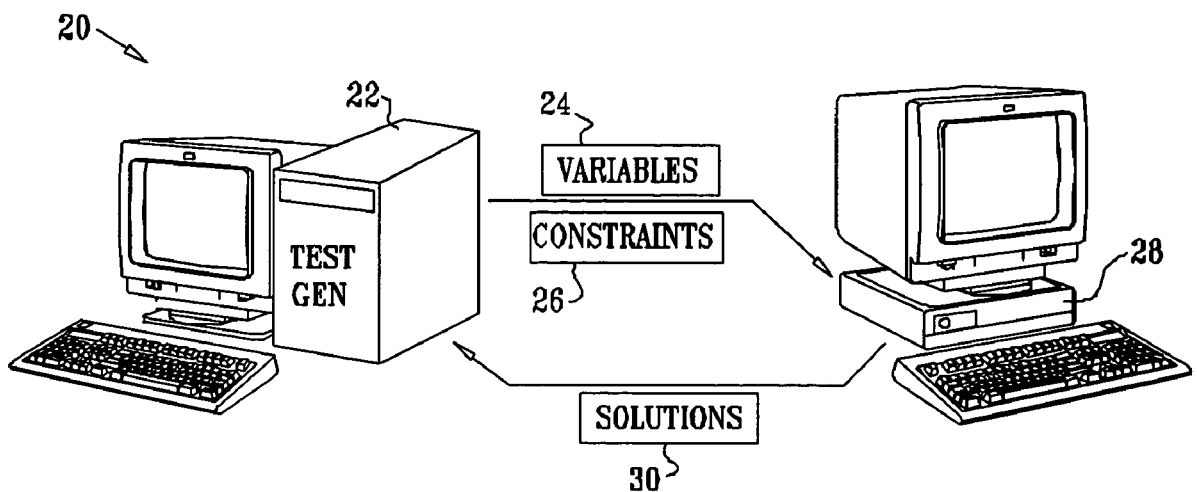
FIG. 1 is a schematic, pictorial illustration of a system for automatic test generation based on CSP solving, in accordance with an embodiment of the present invention.

FIG. 1 is a schematic pictorial illustration of a system 20 for automatic test generation, in accordance with a preferred embodiment of the present invention. A test generator 22, as is known in the art, provides a set of variables 24 and constraints 26 that are characteristic of a type of test to be carried out. These variables and constraints, which define a constraint satisfaction problem (CSP) to be solved, may be determined automatically by test generator 22 or manually, by a user of the system. A CSP processor 28 receives the variables and constraints, and solves the CSP problem to define a set of solutions 30. The solutions in this case may determine values of variables 24 to be used by test generator 22 in testing a given design. Typically, constraints 26 are defined so that tests carried out using solutions 30 examine "interesting" aspects of the hardware design, increasing the likelihood that the test generator will discover design bugs.

Processor 28 solves the CSP defined by variables 24 and constraints 26 using methods based on variable-range hopping, as described hereinbelow. Generally speaking, the variables are represented by processor 28 as sequences of bits. For example, a variable representing data in a computer register may be a sequence of eight bits, while an integer or floating-point variable may be represented as a sequence of 32 bits. A state of the CSP is defined by a set of values of all the variables. The state is changed by flipping the values of certain selected bits (i.e., changing 0 to 1 and vice versa.) Processor 28 treats constraints 26 as objects, each of which operates on a respective subset of the variables. Each constraint calculates its own respective price for any given state of the CSP, depending on the bit values of the variables in its respective subset in that state. The price of a constraint is zero for a given state if and only if the constraint is satisfied in that state. Otherwise, the price is positive. A CSP solver process (referred to hereinafter simply as the "solver"), running on processor 28, sums the prices of all the constraints to determine the topographic cost of the given state. The state is a solution of the CSP if its topographic cost is zero.

The price functions of the constraints are generally defined so that the further the state of the variables from a solution to the CSP, the higher the price. For example, the price function for an equality constraint between two 32-bit integers i and j might be equal to the number of bits in i that differ from the corresponding bits in j. There are no a priori requirements on the relative magnitudes of different constraints, however. In other words, different constraints may have different ranges of prices and need not be normalized.

Typically, processor 28 comprises a general-purpose or dedicated computer, programmed with suitable software for carrying out the cost computation and CSP solving functions described herein. The software may be supplied to the computer in electronic form, over a network or communication link, for example, or it may be provided on tangible media, such as CD-ROM or DVD.

In one embodiment of the present invention, variables 24 define possible inputs to a hardware device or software program under evaluation using test generator 22. These inputs are typically instructions and addresses that would be input to the device or program in normal operation. Processor 28 uses constraints 26 provided by test generator 22, and/or constraints that it receives from an operator or computes automatically itself, to determine variable values corresponding to combinations of the instructions and addresses to be used as test inputs by test generator 22. These inputs may then be applied to the actual device or program, or they may be used as test cases by a simulator for pre-production verification of the design of the device or program.

For instance, test generator 22 may be configured to perform floating point unit verification in microprocessors under development. One example of a test generator of this sort is the FP-Gen test program generator, developed at the IBM Haifa Research Laboratory (Haifa, Israel), as described in the above-mentioned article by Bin et al. In this case, processor 28 is configured to find sets of floating point operands (as values of the CSP variables) that satisfy certain constraints, for use in testing the floating point unit. Ziv et al. present a CSP of this sort in "Test Generation for the Binary Floating Point Add Operation with Mask-Mask-Mask Constraints," *Theoretical Computer Science* 291:2 (2002), pages 1–28, which is incorporated herein by reference. The problem described by Ziv et al. is as follows: given masks $M_a$, $M_b$ and $M_c$, find three floating point numbers a, b and c, which satisfy the constraints of being compatible with the masks and c=round(a±b). The masks are strings of characters, each of which may be 0, 1 or x. A binary number matches the mask if the number and the mask are of identical length, and each numerical character in the mask (0 or 1) is identical to the corresponding bit in the number.

Alternatively, processor 28 may be configured to solve a wide range of other types of constraint satisfaction problems, and is not limited to the test generation application described above. The processor may be used, either in the configuration of a stand-alone computer or integrated with other input and output devices, to carry out substantially any function that can be associated with a constraint network. Examples of such functions are listed in the Background of the Invention, and include controlling a robot based on sensor inputs; analyzing visual or spatial information to identify and characterize objects in an image; parsing natural language input to interpret its meaning; suggesting medical diagnoses based on symptoms and test results; and determining resource allocations and scheduling. Other applications of processor 28 will be apparent to those skilled in the art.

Figure 2:
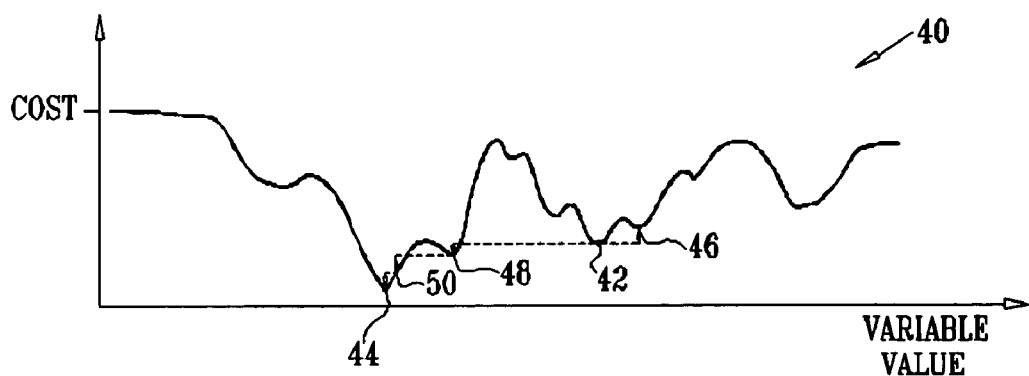
FIG. 2 is a plot that schematically illustrates a cost function used in solving a CSP, in accordance with an embodiment of the present invention.

FIG. 2 is a plot that schematically illustrates a cost function 40 and its use in solving a CSP, in accordance with an embodiment of the present invention. Function 40 represents a one-dimensional section of the state space of an arbitrary CSP, which normally comprises a multi-dimensional hyperspace, in which the number of dimensions is equal to the number of variables. Function 40 is thus a projection of the topography of the CSP along a certain path in the state space. In this example, the topography is characterized by multiple local minima, such as local minima 42, 46 and 48. A global minimum 44 corresponds to a solution to the CSP.

To find the solutions to the CSP, the solver begins from some initial state within the state space, and then hops to a new state by changing the value of a certain variable or variables, such as the variable corresponding to the horizontal axis in FIG. 2. When the new state has a lower topographic cost than the current state, the new state becomes the current state. In this manner, the solver may reach local minimum 42, which is relatively deep and distant from other, lower minima of function 40. Typically, the solver chooses the new states to evaluate at random. In many cases (though not all cases), as a result of learning processes mentioned below, the average hop size to the new states tends to drop as the computed state cost decreases, such as when the current state approaches local minimum 42 in the present example.

To prevent the process from being "trapped" at minima of this sort, the solver intermittently makes hops of variable range, indicated by dashed arrows in FIG. 2. The size of these hops is randomly variable, and is generally independent of the average step size of the hops of non-random length that are normally taken. In the example shown in FIG. 2, some of these variable-range hops are substantially larger than the decreasing range of steps of non-random length. When one of the variable-range hops leads to a new state of higher topographic cost than the current state, such as a state near local minimum 46, the process remains in its current state. On the other hand, when a hop leads to a new state of lower topographic cost, such as near local minimum 48, the current state is replaced by this new state. In this manner, the solver "escapes" from local minimum 42, notwithstanding the large distance that had to be traversed in the state space and the high-cost "barrier" between minima 42 and 48. Thus, unlike methods of CSP solving known in the art, the solver of the present invention may limit its choices of new states to states that are lower in cost than the current state, and need not climb through other states of increased cost in order to cross the barrier.

After hopping to the state at minimum 48, the solver may perform another long-range hop to a state 50, following which the solution converges by steps of decreasing size until it reaches global minimum 44. Note also that the local minima of function 40 have a roughly periodic spacing one from another. Periodicities of this sort are common in some types of CSPs, although they may not be evident from the constraints themselves. In an embodiment of the present invention, the solver dynamically "learns" this sort of characteristics of the problem topography as it steps through the states of the problem, and then applies what it has learned in choosing the sizes and types of subsequent steps that it takes. Details of this method of dynamic learning and other types of characteristics that the solver may learn and apply in this manner are described hereinbelow.

Figure 3:
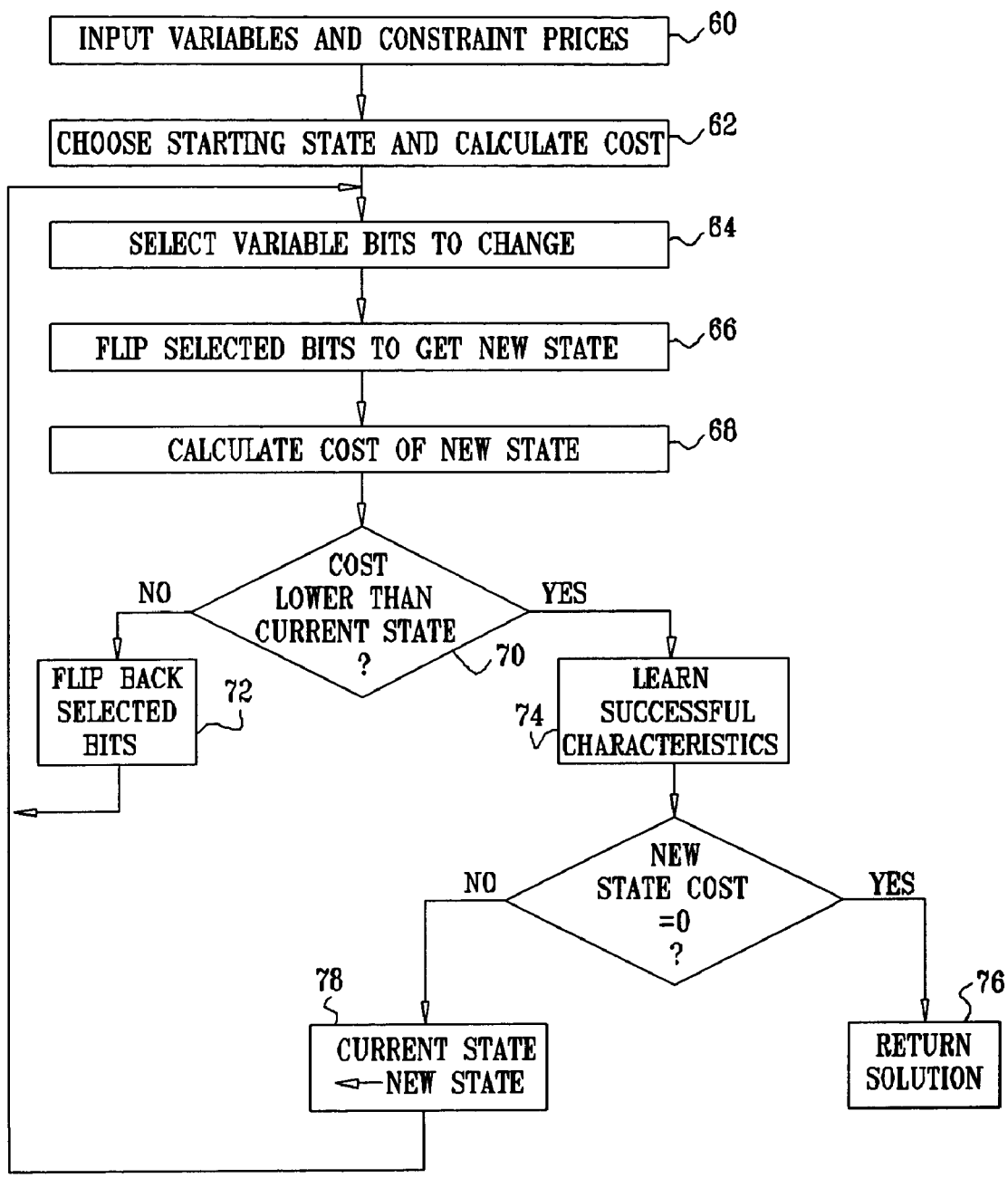
FIG. 3 is a flow chart that schematically illustrates a method for CSP solving, in accordance with an embodiment of the present invention.

FIG. 3 is a flow chart that schematically illustrates a method for CSP solving, in accordance with an embodiment of the present invention. The CSP solver on processor 28 receives definitions of variables 24 and constraints 26, at a problem definition step 60. The constraints are accompanied by their respective price functions or, alternatively, an operator of processor 28 sets the price functions at this stage. As noted above, the constraints may be embodied in objects, which compute their own respective prices.

The solver initializes variables 24 in order to define a starting state for solving the CSP, at an initialization step 62. For this purpose, the solver may instruct each of the constraints to initialize the variables in the variable subset to which it applies. A number of different initialization strategies may be used at this point, for example:

Elimination: A constraint may determine that a given bit must have a specific value (either 0 or 1). For example, a mask constraint, as described above, may be satisfied only when certain bits of the variables to which the constraint applies have certain specific values. In this case, the constraint sets these bits to the specific values and marks the bits as "inactive," indicating to the solver that these bits may never be flipped. The search space is thus reduced.

Node consistency: If a bit is set "inactive" by two different constraints with different values (one 0 and the other 1), the CSP is deemed unsatisfiable, and the solver terminates with an appropriate message.

Uniform random initialization: In some cases it may be possible to determine analytically that there is a certain set of variable values that are consistent with a given constraint. In such cases, the constraint may initialize these variables to values within the consistent set. In some CSP applications, such as random test generation, it is desirable that the solutions that are returned by processor 28 be uniformly distributed over the domain of variables. Therefore, to facilitate the uniform distribution of the solutions, the constraint chooses the initial values of the variables at random out of a uniform distribution of the consistent values. Unlike the elimination strategy mentioned above, the bits that are set in this manner may still be flipped to other values (within the consistent set), and they are not marked as inactive.

Other methods for initializing the variables will be apparent to those skilled in the art. In any case, after choosing the starting state, the solver calculates the cost of the state, as the sum of the individual constraint prices.

The CSP solver now explores new states, in order to find a path from the initial state to a state that solves the CSP. For this purpose, the solver first decides which bits of which variables will be flipped in order to generate the new state from the current state, at a bit selection step 64. Typically, the algorithm used in determining which bits to flip may change and be adjusted as the CSP solving process progresses. For example, the solver may use the following sequence of strategies at step 64:

1. Relaxation phase: At the beginning of the solution process, typically over a first predefined number of hops (such as the first 1000 hops), bits to be flipped are chosen at random. This strategy allows for fast relaxation away from states that are not characteristic of the low-lying areas of the problem topography.
2. Initial learning phase: During a second predefined number of hops (such as the next 10,000 hops), the bits to be flipped are still selected at random, but now, since the states are presumably in a lower-lying area of the topography, characteristics of "successful" hops (leading to states of reduced cost) are saved and learned. Details of this learning process are described hereinbelow.
3. Learned phase: At each hop, processor 28 decides at random whether to choose the bits to be flipped at random, or to choose the bits to be flipped according to some or all of the learned characteristics. In any case, the bits to be flipped are chosen at random. When a learned choice is to be made, the bits to be flipped are chosen at random from a pool of learned values. The learned values are weighted, as described below, so that the random choice favors characteristics that have been shared by greater numbers of past successful hops. The learning process begun in phase 2 typically continues during phase 3.

Note that in all phases of the CSP solution process, the bits to be flipped are chosen totally at random in at least some of the iterations through step 64 (including iterations that are interleaved in sets of deterministic hops, as described below). These random hops may typically be of any range whatsoever, and therefore may be large compared to the learned steps. They enable processor 28 to perform the type of variable-range hopping described above, and thus to escape from local minima in the topography. The relative ratio of random hops to hops based on learned choices and/or deterministic strategies may be set by an operator of processor 28 or, alternatively or additionally, may be learned by the processor based on results of past iterations.

It is also possible, in phases 2 and 3 above, to interleave deterministic strategies with the random selection of bits to be flipped at each hop. The choice at each hop between selecting the bits to flip deterministically or at random is itself made randomly. The bias in this random choice may be determined by learning, based on past hops, whether the deterministic selection of bits to flip or the random selection has been more successful in finding new, lower-cost states.

In general, each deterministic strategy is an object that supplies a list of sets of bits, causing processor 28 to select all the bits in each successive set to be flipped together in order to define a new state. In this manner, a certain portion of the state space of the CSP can be evaluated systematically. The size of the sets in the list (and thus the length of the list, as well) is determined by a "difficulty" parameter d, which is set by the solver. For example, a generic deterministic strategy could provide a list of all combinations of d bits, out of a total set of N variable bits, listed in their natural order. Thus, for d=1, the list is <{1}, {2}, {3}, ..., {N}>. For d=2, the list is <{1,2}, {1,3}, ..., {1,N}, {2,3}, ..., {2,N}, ... {N−2,N−1}, {N−2,N}, {N−1,N}>, As another example, the following domain-specific strategy may be used in the "generalized queens" CSP. In this problem, processor 28 attempts to distribute k queens on each row of a chess board, subject to some interaction between the queens in each row and the queens in other rows. (In the classical queens problem, eight queens must be distributed over the chess board in such a way that no queen may attack any other queen by the conventional interactions defined by the rules of chess. The generalized queens problem expands upon the classical problem.) Each row of the chess board can be represented as an 8-bit variable, wherein a queen on a given square of the board is represented by a bit equal to 1 in the variable. In the present example, the deterministic strategy for determining which bits to flip at each hop attempts to preserve the number of queens in a given row on the board while trying different values of the variable that are compatible with this number. In this case, for d=1, the list of bits that can be flipped is empty (since flipping a single bit either removes a queen from or adds a queen to the row). For d=2, assuming the queens to be initially in positions {2, 5, 7}, the list is <{1,2}, {3,2}, {4,2}, {6,2}, {8,2}, {1,5}, {3,5}, {4,5}, {6,5}, {8,5}, {1,7}, {3,7}, {4,7}, {6,7}, {8,7}>, and so on for other rows.

Following the selection of the bits at step 64 (regardless of the strategy selected), the CSP solver flips all the selected bits simultaneously, at a bit flipping step 66, thus defining a new state to be evaluated. The constraints calculate their respective prices for this new state, and the solver sums the constraint prices to determine the new state cost, at a cost calculation step 68. At a cost comparison step 70, the solver compares this new state cost to the cost of the current state, which was calculated previously. If the cost of the new state is no lower than the current state cost, the bits that were flipped at step 66 are flipped back, returning to the current state, at a new state rejection step 72. Alternatively, the solver may remain in the new state if it has the same cost as the current state, and flip the bits back only if the cost of the new state is higher than the current state. The solver then returns to step 64 to select another new state to evaluate.

On the other hand, if the solver finds at step 70 that the new state has a lower cost than the current state, it discards the current state and keeps the new state for further processing. Since the selection of bits to be changed, made at step 64, was successful in reducing the cost, processor 28 learns the characteristics of this state hop, at a learning step 74. These learned characteristics are applied in subsequent iterations through step 64, as described above. The characteristics learned at step 74 may include, for example, characteristic hop sizes (i.e., the number of bits to be flipped in each hop); sets of correlated bits (which should be flipped together if at all); and the success of stochastic as opposed to deterministic bit selection. The characteristics of successful steps are generally learned at step 74 irrespective of whether the set of bit flips in the current hop was selected randomly, based on a learned characteristic, or based on a deterministic strategy.

Typically, for the purpose of learning step 74 and subsequent application of the learned characteristics, the solver creates a "container" of values for each characteristic in question. When a hop is found at step 70 to have been successful, the value of each of the characteristics of the set of bit flips making up the hop is stored in the respective container. The characteristic values stored in the containers remain there indefinitely, for the duration of the CSP solving process (i.e., the values are typically not removed from the containers with age). Subsequently, when a new set of bits to flip is to be selected at step 64 in the learned phase, and one or more of the learned characteristics are to be used in the selection, the solver chooses a value of each of these characteristics at random from the appropriate containers. Note that when a learned characteristic is used in selecting the bits to flip at step 64, and the selection is again found to be successful at step 70, the value of the learned characteristic is again entered in the container. Thus, successful values are reinforced by positive feedback, increasing the likelihood that these values will be selected again.

For example, for the characteristic "hop size," the corresponding container may hold integer values indicating the number of bits flipped in each successful hop. At some stage, this container may hold the following values: <12, 11, 12, 13, 13, 12, 8, 7, 3, 2, 1, 2, 1, 1, 1, 1, 2, 1, 2, 1, 2, 2, 2, 2, 2, 2, 1, 2, 1, 2, 2, 2>. This sequence of values suggests that during early iterations through the process, the characteristic length of successful hops was around 12, while later it decreased to around 2. In this example, the chance of choosing a hop size of 2 in the next learned selection at step 64 is 14/32 (corresponding to the number of 2's out of the total number of values in the container). As long as hops of size 2 continue to lead to lower-cost states, additional 2's will be entered in the container, and the probability of selecting another 2-hop at step 64 will continue to increase. Note, however, that the higher values remaining in the container may still be selected, as well, and are typically more likely to be chosen than totally-random hop sizes. Selection of these higher learned values may thus increase the chance of escaping from a small local minimum.

As noted above, solutions of the CSP are typically characterized by a zero state cost. Thus, if processor 28 determines that the new state chosen at step 66 has zero cost, it returns this state as a solution of the CSP, at a solution step 76. Otherwise, since the new state was at least determined to have lower cost than the previous current state, the current state is discarded, and the new state becomes the current state, at a state replacement step 78. The process then continues with the selection of the next hop at step 64, and iterates through the remaining steps until a solution is found (or until processor 28 times out).

Alternatively, when a deterministic strategy is used, as described above, the costs of all the states generated by a predetermined list of bit flips may be evaluated one after another at steps 64 through 68. Typically, randomly-chosen hops of both learned length and random length are interleaved among the deterministic hops in the list. If any of the states (deterministically-chosen or random) has zero cost, this state may be returned as a solution to the CSP, at step 76. Otherwise, if more than one of the new states has a lower cost than the current state, the new state with the lowest cost is selected to replace the current state at step 78. If more than one of the new states share this lowest cost, one of the lowest-cost states is selected at random. After iterating through the list of bit flips, the above-mentioned difficulty factor d may be incremented at step 78, in order to determine the new list of bit flips to be used in the next iteration.

Although the embodiments described above use binary representations of variables and use bitwise distance measures, the principles of the present invention may similarly be applied to other variable representations and distance measures, as are known in the art. Similarly, other types of cost functions may be used. The term "zero cost," as used herein, is simply a convenient way of identifying states that satisfy the constraints of the CSP, and the term "lower cost" indicates generally that the lower-cost state is relatively closer to the solution, in terms of the numbers and types of constraints solved, than another "higher-cost" state. Therefore, methods for CSP solving using other constraint pricing schemes and scales to implement the principles of the present invention are also considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for solving a constraint satisfaction problem (CSP) defined by a group of variables and constraints applicable to the variables, the method comprising the steps of:
   (a) choosing a first state corresponding to a first set of values of the variables;
   (b) selecting a hop distance within a state space of the variables responsively to a random distance selection criterion;
   (c) choosing a second state corresponding to a second set of the values of the variables, such that the second state is separated from the first state by the hop distance;
   (d) comparing a first cost, determined by applying the constraints to the first set of the values of the variables, to a second cost, determined by applying the constraints to the second set of the values of the variables;
   (e) if the second cost is closer than the first cost to meeting a condition indicative that the constraints are satisfied, redefining the first state to correspond to the second set of the values of the variables;
   (f) repeating steps (b) through (e) until the second cost meets the condition, whereby the second set of the values of the variables represents a solution of the CSP, wherein the variables are characteristic of features of an image containing visual information; and
   (g) identifying an object in the image based on the features, responsively to the second set of the values of the variables.

2. The method according to claim 1, wherein the variables are characteristic of a natural language input, and comprising (g) parsing the natural language, responsively to the second set of the values of the variables, so as to interpret the language.

3. The method according to claim 1, wherein the variables are characteristic of a condition, and comprising (g) determining a diagnosis of the condition responsively to the second set of the values of the variables.

4. The method according to claim 1, wherein the variables are characteristic of resources whose use is to be scheduled, and comprising (g) scheduling the use of the resources responsively to the second set of the values of the variables.

5. Apparatus for solving a constraint satisfaction problem (CSP) defined by a group of variables and constraints applicable to the variables, the apparatus comprising a CSP processor, which is arranged to solve the CSP by the steps of:

(a) choosing a first state corresponding to a first set of values of the variables;

(b) selecting a hop distance within a state space of the variables responsively to a random distance selection criterion;

(c) choosing a second state corresponding to a second set of the values of the variables, such that the second state is separated from the first state by the hop distance;

(d) comparing a first cost, determined by applying the constraints to the first set of the values of the variables, to a second cost, determined by applying the constraints to the second set of the values of the variables;

(e) if the second cost is closer than the first cost to meeting a condition indicative that the constraints are satisfied, redefining the first state to correspond to the second set of the values of the variables; and (f) repeating steps (b) through (e) until the second cost meets the condition, whereby the second set of the values of the variables represents a solution of the CSP, wherein the variables are characteristic of features of an image containing visual information, and wherein the processor is arranged to identify, responsively to the second set of the values of the of the variables, an object in the image based on the features.

6. The apparatus according to claim 5, wherein the variables are characteristic of a natural language input, and wherein the processor is arranged to parse the natural language, responsively to the second set of the values of the of the variables, so as to interpret the language.

7. The apparatus according to claim 5, wherein the variables are characteristic of a condition, and wherein the processor is arranged to determine, responsively to the second set of the values of the of the variables, a diagnosis of the condition.

8. The apparatus according to claim 5, wherein the variables are characteristic of resources whose use is to be scheduled, and wherein the processor is arranged to schedule the use of the resources responsively to the second set of the values of the of the variables.

9. A computer software product for solving a constraint satisfaction problem (CSP) defined by a group of variables and constraints applicable to the variables, the product comprising a computer-readable medium, in which program instructions are stored, which instructions, when read by a computer, cause the computer to solve the CSP by the steps of:

(a) choosing a first state corresponding to a first set of values of the variables;

(b) selecting a hop distance within a state space of the variables responsively to a random distance selection criterion;

(c) choosing a second state corresponding to a second set of the values of the variables, such that the second state is separated from the first state by the hop distance;

(d) comparing a first cost, determined by applying the constraints to the first set of the values of the variables, to a second cost, determined by applying the constraints to the second set of the values of the variables;

(e) if the second cost is closer than the first cost to meeting a condition indicative that the constraints are satisfied, redefining the first state to correspond to the second set of the values of the variables; and (f) repeating steps (b) through (e) until the second cost meets the condition, whereby the second set of the values of the variables represents a solution of the CSP, wherein the variables are characteristic of features of an image containing visual information, and wherein the instructions cause the computer to identify, responsively to the second set of the values of the of the variables, an object in the image based on the features.

10. The product according to claim 9, wherein the variables are characteristic of a natural language input, and wherein the instructions cause the computer to parse the natural language, responsively to the second set of the values of the of the variables, so as to interpret the language.

11. The product according to claim 9, wherein the variables are characteristic of a condition, and wherein the instructions cause the computer to determine, responsively to the second set of the values of the of the variables, a diagnosis of the condition.

12. The product according to claim 9, wherein the variables are characteristic of resources whose use is to be scheduled, and wherein the instructions cause the computer to schedule the use of the resources responsively to the second set of the values of the of the variables.

* * * * *